United States Patent
Ihs

(10) Patent No.: US 9,859,793 B2
(45) Date of Patent: Jan. 2, 2018

(54) SWITCHED POWER STAGE WITH INDUCTOR BYPASS AND A METHOD FOR CONTROLLING SAME

(71) Applicant: Endura Technologies LLC, San Diego, CA (US)

(72) Inventor: Hassan Ihs, Vendargues (FR)

(73) Assignee: Endura Technologies LLC, San Diego, CA (US)

( * ) Notice: Subject to any disclaimer, the term of this patent is extended or adjusted under 35 U.S.C. 154(b) by 0 days.

(21) Appl. No.: 14/590,813

(22) Filed: Jan. 6, 2015

(65) Prior Publication Data

US 2015/0194882 A1    Jul. 9, 2015

Related U.S. Application Data

(60) Provisional application No. 61/924,349, filed on Jan. 7, 2014.

(51) Int. Cl.
    *H02M 3/158*    (2006.01)
    *H02M 3/156*    (2006.01)
    *G05F 1/10*    (2006.01)

(52) U.S. Cl.
    CPC .............. *H02M 3/158* (2013.01); *G05F 1/10* (2013.01); *H02M 3/156* (2013.01); *H02M 2003/1566* (2013.01)

(58) Field of Classification Search
    CPC .................................................. H02M 3/156
(Continued)

(56) References Cited

U.S. PATENT DOCUMENTS 6,271,651 B1 * 8/2001 Stratakos .................. G05F 1/40
                                                                     323/282
6,509,721 B1 * 1/2003 Liebler ................. H02M 3/158
                                                                     323/224

(Continued)

FOREIGN PATENT DOCUMENTS

CN              103427624 A      12/2013
EP              2432107 A1      3/2012
(Continued)

OTHER PUBLICATIONS

P. Dananjayan et al., "A New Constant Frequency Zero Voltage Switching Buck Quasi-Resonant Converter", Proceedings of the 1996 International Conference on Power Electronics, Drives and Energy Systems for Industrial Growth, Jan. 8-11, 1996., vol. 1, pp. 176-182, IEEE.

(Continued)

*Primary Examiner* — Jue Zhang
*Assistant Examiner* — Trinh Dang
(74) *Attorney, Agent, or Firm* — Klein, O'Neill & Singh, LLP

(57) ABSTRACT

The disclosure relates to a method of generating an output voltage from a high input voltage and a command signal, the method comprising: providing an inductor having a first terminal and a second terminal linked to a low voltage by a capacitor, the second inductor terminal supplying the output voltage to a load, the low voltage being lower than the high input voltage; and connecting the first inductor terminal either to the high input voltage or to the inductor second terminal, as a function of the command signal.

4 Claims, 11 Drawing Sheets

(58) Field of Classification Search
USPC .................................. 323/272, 274, 284, 283
See application file for complete search history.

(56) References Cited

U.S. PATENT DOCUMENTS

| | | | |
|---|---|---|---|
| 2006/0091867 A1 | 5/2006 | Durbaum et al. | |
| 2006/0176038 A1 | 8/2006 | Flatness et al. | |
| 2007/0096707 A1 | 5/2007 | Xi | |
| 2008/0291711 A1 | 11/2008 | Williams | |
| 2009/0115388 A1 | 5/2009 | Miyazaki et al. | |
| 2011/0181261 A1* | 7/2011 | Kalechshtein | H02M 1/34 323/284 |
| 2012/0081095 A1 | 4/2012 | Kung | |
| 2013/0300392 A1 | 11/2013 | Laur et al. | |
| 2014/0021933 A1* | 1/2014 | Gladish | H02M 1/08 323/311 |

FOREIGN PATENT DOCUMENTS

| | | |
|---|---|---|
| JP | 2008-072872 A | 3/2008 |
| JP | 2009-100602 A | 5/2009 |
| KR | 10-2010-0027931 A | 3/2010 |

OTHER PUBLICATIONS

K.T. Chau, "A New Pulsewidth-Modulated Zero-Voltage-Switching Multi-Resonant Converter Using Resonant Inductor Freewheeling", Applied Power Electronics Conference and Exposition, 1994. APEC '94. Conference Proceedings 1994, Ninth Annual, vol. 2, pp. 984-990, IEEE.

Katsuya Hirachi et al., "A Specific Control Implementation on Back-Type Active Power Filtering Converters", Telecommunications Energy Conference, 1995. INTELEC '95, 17th International Digital Object Identifier: 10.1109/INTLEC.1995.498994, Publication Year: 1995, Page(s): 444-449.

John C. Salmon, "Buck-Type Hybrid Inverter Drive", Power Electronics Specialists Conference, 1993. PESC '93 Record, 24th Annual IEEE, pp. 1172-1178.

Katsuya Hirachi, et al. "Improved Control Strategy on Buck-Type Converter with Power Factor Correction Scheme", Proceedings of the 1996 International Conference on Power Electronics, Drives and Energy Systems for Industrial Growth, Jan. 8-11, 1996, vol. 2, pp. 826-832, IEEE.

Dan M. Sable et al., "Elimination of the Positive Zero in Fixed Frequency Boost and Flyback Converters", Applied Power Electronics Conference and Exposition, 1990. APEC '90, Conference Proceedings, Mar. 11-16, 1990, Fifth Annual, pp. 205-211, IEEE.

Hiroto Terashi et al., "Stability and Dynamic Response Improvement of Flyback DC-DC Converter by a Novel Control Scheme", Applied Power Electronics Conference and Exposition, Mar. 10-14, 2002. APEC 2002. Seventeenth Annual IEEE, vol. 1, pp. 389-394.

International Search Report on related PCT Application No. PCT/US2015/010362 from International Searching Authority (KIPO) dated Apr. 23, 2015.

Written Opinion on related PCT Application No. PCT/US2015/010362 from International Searching Authority (KIPO) dated Apr. 23, 2015.

Extended European Search Report (EESR) on related European Application No. 15734969.7 from the European Patent Office (EPO) dated Feb. 14, 2017.

* cited by examiner

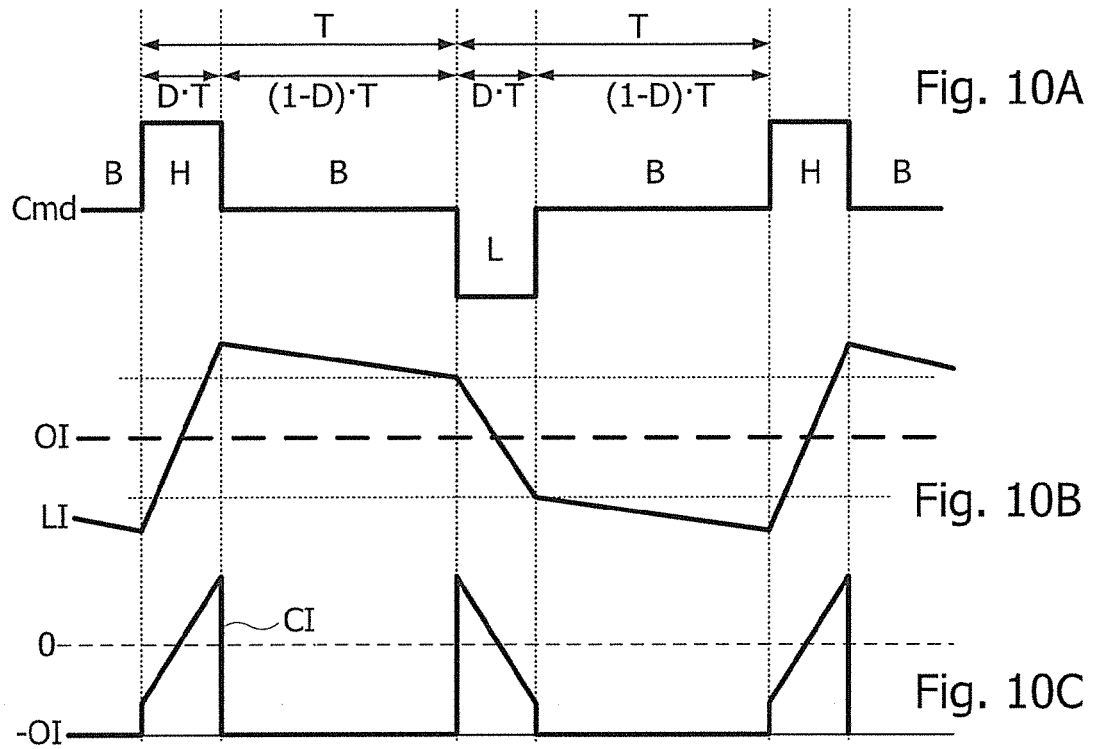
Fig. 10A
Fig. 10B
Fig. 10C
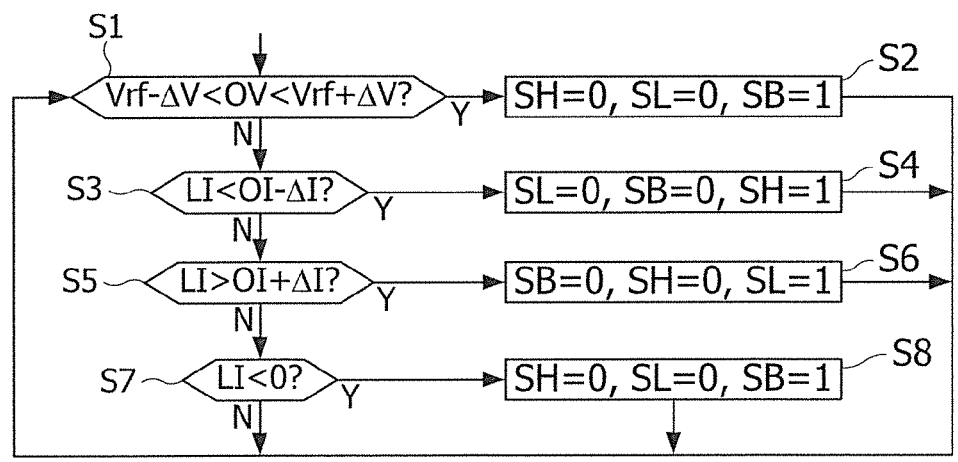
Fig. 11

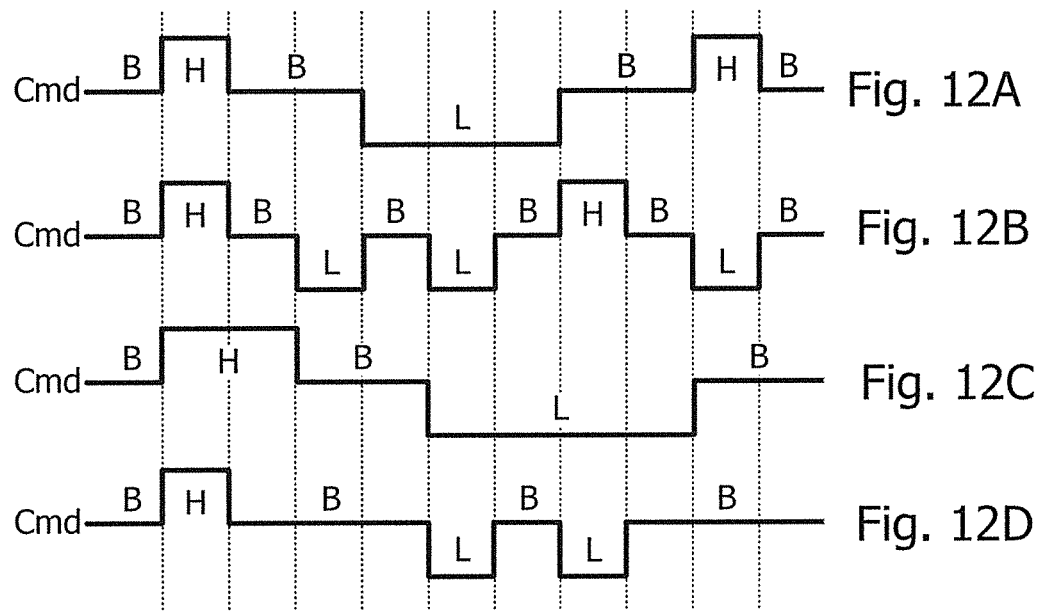
Fig. 12A
Fig. 12B
Fig. 12C
Fig. 12D
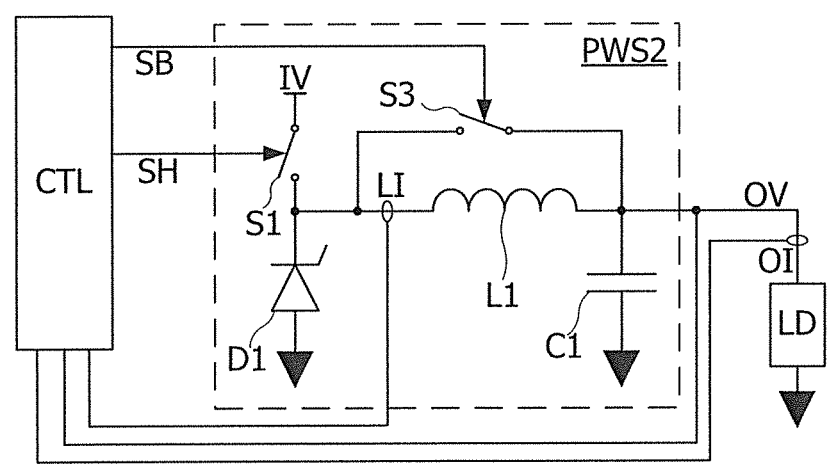
Fig. 13

SWITCHED POWER STAGE WITH INDUCTOR BYPASS AND A METHOD FOR CONTROLLING SAME

CROSS REFERENCE TO RELATED APPLICATIONS

This application claims the benefit of the filing date of U.S. Provisional Patent Application No. 61/924,349, filed on Jan. 7, 2014, the disclosure of which is incorporated by reference herein.

BACKGROUND OF THE INVENTION

The present disclosure generally relates to power stages and voltage converters, and especially to DC-DC converters or switched voltage regulators, capable of varying output voltage and current as a function a processing load of circuits powered by such a converter.

DESCRIPTION OF THE RELATED ART

Switched voltage converters are used to convert between differing DC voltages in a wide range of applications. Among switched voltage converters, step-down converters are used to provide a reduced voltage from a higher voltage supply. Typical uses of switched power stages comprise DC-DC converters in particular for battery-operated devices, power stage for class-D amplifiers including audio amplifiers, motor drive circuits, photovoltaic inverters, etc. Such a switched power stage is schematically shown in FIG. 1. The power stage PWS comprises switches S1, S2 which are used to alternately connect a first terminal of an inductor L1 to a supply voltage IV and to a k-low voltage such as ground voltage, at a switching frequency. A second terminal of the inductor L1 is connected to a load LD and linked to the ground by a capacitor C1. The switches S1, S2 are controlled by respective signals SH and SL provided by a control circuit CTL, so that when the switch S1 is turned on, the switch S2 is turned off and conversely.

In battery-operated devices such as mobile phones, smart phones, digital tablets, there is a need to increase the battery life. To this purpose, the circuits of the device that are not used are powered off or receive a reduced power. Thus the supply current requested by the device may dramatically vary. When one or more circuits of the device are deactivated, the current drawn by the device may drop very shortly, thus resulting in a voltage overshoot if the supplied current does not follow this drop. This voltage overshoot may be reduced by increasing the size of the capacitor C1.

In addition to the voltage overshoot, the current ripple of the inductor need to be taken into account to reduce switching core loss of the inductor and keep the peak current within the maximum current rating of the inductor and the battery. The optimization of switching losses while maintaining the average current loads closer to the maximum rating constrains the range of inductor values appropriate for a given input to output voltage ratio and operating frequency. For a DC-DC converter operating with 1 Mhz or slower PWM control, the inductor must typically be sized to 1 µH or larger to meet these constraints. Such a big inductor cannot be compact and integrated in a semiconductor chip. Conversely when a circuit of the powered device is activated, it should be powered on in a very short time, inducing a sudden rise of the current drawn by the device. One way to follow such a current draw is to reduce the size of the inductor L1.

There is also a need to use components of small height and reduced surface on printed-circuit boards to manufacture thin and small devices. This requirement imposes to reduce the size of inductor L1 and capacitor C1, and thus to increase the commutation frequency of the switches S1, S2, which increases the energy losses in the switches.

Further, each new generation of processors used in such portable devices tends to be more powerful while being smaller and operating at lower supply voltages. In addition, to increase their life by reducing the current supplied by each battery cell, the number of battery cells assembled both in series and in parallel within the batteries tends to increase. Accordingly the input voltage of the DC-DC converter tends to increase whereas the output voltage to be supplied to the devices tends to decrease, which requires a bigger inductor. This results in subjecting the inductor to conflicting requirements.

Therefore there is a need to provide a switched power stage which does not require an inductor having a high value. There is also a need to provide a switched power stage capable of following strong variations of current demands without generating voltage overshoots. There is also a need to provide a step-down DC-DC converter capable of converting a high supply voltage, in the range of 5 to 20 V, into a much lower regulated voltage, in the order of 1 V.

BRIEF SUMMARY OF THE INVENTION

Embodiments of the disclosure relate to a method of generating an output voltage from a high input voltage and a command signal, the method comprising: providing an inductor having a first terminal and a second terminal linked to a low voltage by a capacitor, the second inductor terminal supplying the output voltage to a load, the low voltage being lower than the high input voltage; and connecting the first inductor terminal either to the high input voltage or to the inductor second terminal, as a function of the command signal.

According to an embodiment, the method comprises connecting the first inductor terminal to the low voltage, as a function of the command signal which has three distinct states.

According to an embodiment, the method comprises determining the state of the command signal as a function of current intensity supplied to the load and/or current intensity within the inductor and/or voltage supplied to the load, to maintain the voltage supplied to the load substantially constant.

According to an embodiment, the command signal is configured to command connection of the first inductor terminal to the second inductor terminal before connecting the first inductor terminal to the high voltage when connected to the low voltage, and before connecting the first inductor terminal to the low voltage when connected to the high voltage.

According to an embodiment, the command signal is configured to be periodic and to command connection at each command signal period of the first inductor terminal to the high voltage and to the low voltage during a part of the command signal period and to the second inductor terminal during a remaining part of the command signal period.

According to an embodiment, the command signal is configured to change of state at each period of a clock signal.

According to an embodiment, the command signal has a shape of a three-state signal produced by a modulator of one of the types PWM, DPWM, PFM and PDM.

According to an embodiment, the method comprises connecting the first inductor terminal to the second inductor terminal to configure a circuit as a Low Drop Out regulator, and disconnecting the first inductor terminal from the second inductor terminal to configure the circuit as a DC-DC converter.

Embodiments also relate to a switched power stage comprising: an inductor having a first terminal linked to a high voltage source by a first switch, a capacitor linking to a low voltage source a second terminal of the inductor, the second inductor terminal forming an output of the power stage, and a second switch connected between the first and second inductor terminals, the first and second switches being controlled to connect the first inductor terminal to the high voltage source or to the second inductor terminal as a function of a command signal.

According to an embodiment, the power stage comprises a third switch linking the first inductor terminal to the low voltage source, the first and third switches being controlled so as to alternately connect the first inductor terminal to the high voltage source or to the low voltage source.

According to an embodiment, the power stage comprises a diode linking the first inductor terminal to the low voltage source for setting the first inductor terminal to the low voltage when it has a negative voltage.

According to an embodiment, the power stage comprises a diode linking the first inductor terminal to the low voltage source for setting the first inductor terminal to the low voltage when it has a negative voltage.

According to an embodiment, the power stage comprises several inductors mounted in series between the first and second inductor terminals, each inductor being associated with a switch connected in parallel to the inductor and controlled by the command signal.

Embodiments also relate to a circuit comprising: an inductor having a first terminal linked to a high voltage source by a first switch controlled as a function of a measure of a current in the inductor, a capacitor linking to a low voltage source a second terminal of the inductor, the second inductor terminal forming an output of the circuit, and a second switch connected between the first and second inductor terminals, the second switch being closed to configure the circuit as a Low Drop Out regulator, or open to configure the circuit as a switched power stage.

According to an embodiment, the circuit comprises a third switch linking the first inductor terminal to the low voltage source, the first and third switches being controlled so as to alternately connect the first inductor terminal to the high voltage source or to the low voltage source.

Embodiments also relate to a class D power amplifier comprising: an inductor having a first terminal linked to a high voltage source by a first switch, and to a low voltage source by a second switch, a capacitor linking a second terminal of the inductor to a low voltage source, the second inductor terminal forming an output of the power amplifier, and a third switch connected between the first and second inductor terminals, a modulator providing a three-state command signal as a function of an input signal to be amplified, the first, second and third switches being controlled as a function of the command signal.

According to an embodiment, the modulator is of the type PWM, PFM or sigma-delta.

These and other aspects of the invention are more fully comprehended upon review of this disclosure.

BRIEF DESCRIPTION OF THE FIGURES

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 10A, 10B, 10C are timing chart of signals illustrating operation of the switched power stage;

FIG. 11 is a flow chart illustrating an example of a process executed by a control circuit of the switched power stage, according to an embodiment;

FIGS. 12A, 12B, 12C, 12D are examples of timing chart of command signals illustrating operation of the control circuit of the switched power stage;

FIG. 13 is a circuit diagram of a switched power stage according to another embodiment;

DETAILED DESCRIPTION

Figure 2:
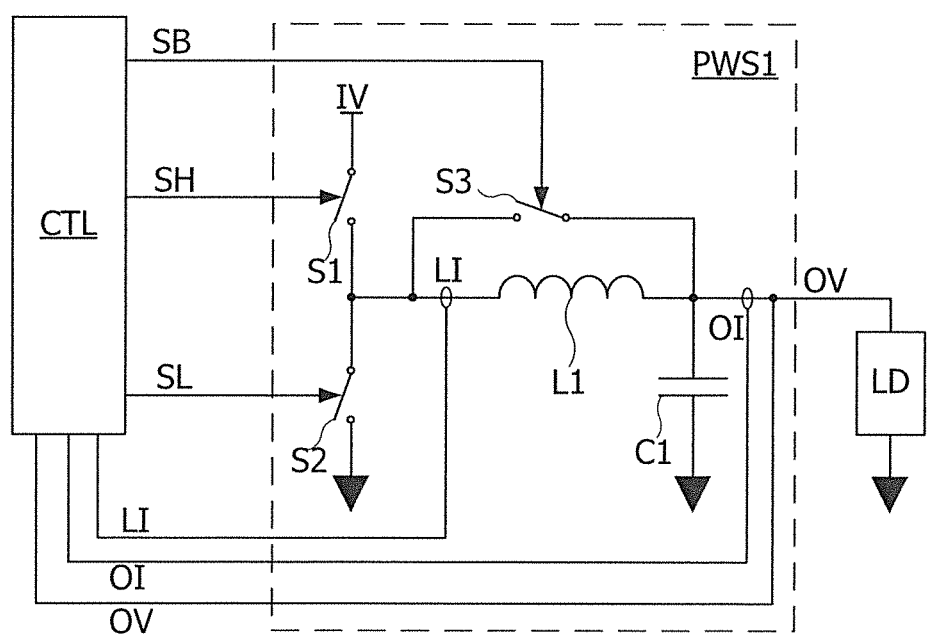
FIG. 2 is a circuit diagram of a switched power stage according to an embodiment.

FIG. 2 is a circuit diagram of a switched power stage according to an embodiment. Referring to FIG. 2, a switched power stage PWS1 of this embodiment, which is a step-down type converter, includes switches S1, S2, S3, an inductor L1, a capacitor C1 and a control circuit CTL controlling the switches S1, S2, S3. A first terminal of the switch S1 is connected to a voltage source providing an input voltage IV. A second terminal of switch. S1 is connected to a first terminal of inductor L1, a first terminal of switch S2 and a first terminal of switch S3. A second terminal of switch S2 is connected to the ground. A second terminal of inductor L1 is connected to a second terminal of switch S3, and to a first terminal of capacitor C1, which supplies an output voltage OV to a terminal of a load LD having another terminal connected to the ground. The second terminal of capacitor C1 is connected to the ground. The control circuit CTL may receive a measure signal of output voltage OV. In some embodiments, current intensity measures of the current LI flowing through inductor L1 may be provided to the control circuit CTL with output voltage OV. In some embodiments a measure signal of a current intensity of the current OI flowing through load LD could also be provided to control circuit CTL. The control circuit CTL outputs control signals SH, SL and SB, for controlling respectively switches S1, S2 and S2. The control circuit CTL is configured to generate the control signals SH, SL, SB as a function of output voltage OV. A better control could be obtained using both output voltage OV and inductor current IL, and possibly load current OI. The control signals SH, SL, SB may be exclusive to close switches S1, S2, S3, so that at any time a single one of switches S1, S2, S3 is on whereas the others of switches S1, S2, S3 are off. For this to happen, the control circuit CTL may turn off all the switches S1, S2, S3 before turning on one of the latter. However some applications may require simultaneous closing switches S3 and S1 or S3 and S2. Such a control of switches does not generate any power loss, in contrast with simultaneous closing of switches S1 and S2 which would directly link the voltage source IV to ground.

For example, switches S1, S2, S3 may be formed of MOSFET transistors, with a p-channel MOS transistor forming switch S1 and n-channel MOS transistors forming switches S2 and S3. Inductor current LI measures could be performed in switches S1, S2 and S3. Switches S1, S2, S3 could also be implemented using BCD (Bipolar/CMOS/DMOS) technology to extend reliability at high voltage operation. Switch transistors may or may not be integrated with the control logic on the same die.

Figure 3A:
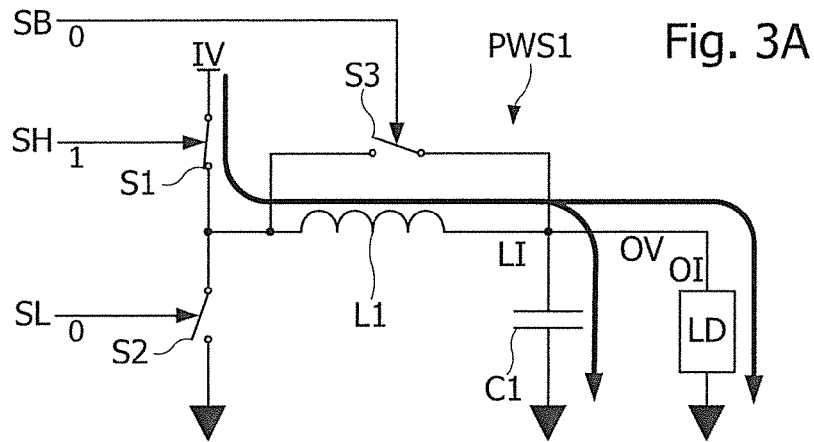
FIGS. 3A, 3B, 3C are simplified circuit diagrams of the switched power stage, illustrating operation modes of the power stage.
Figure 3B:
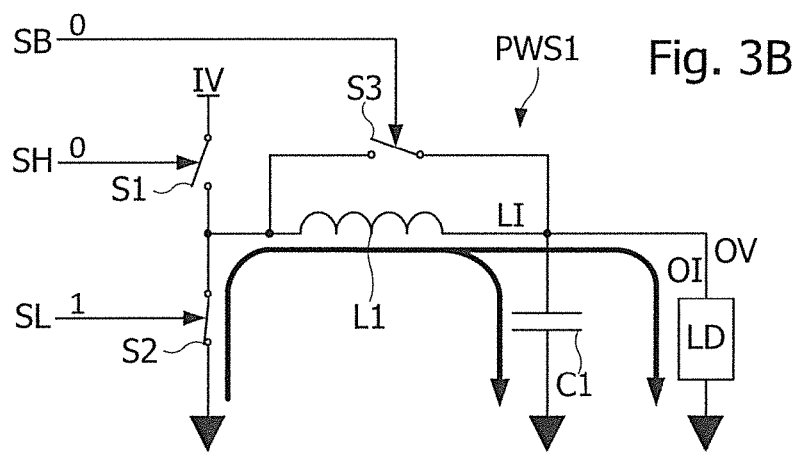
Figure 3C:
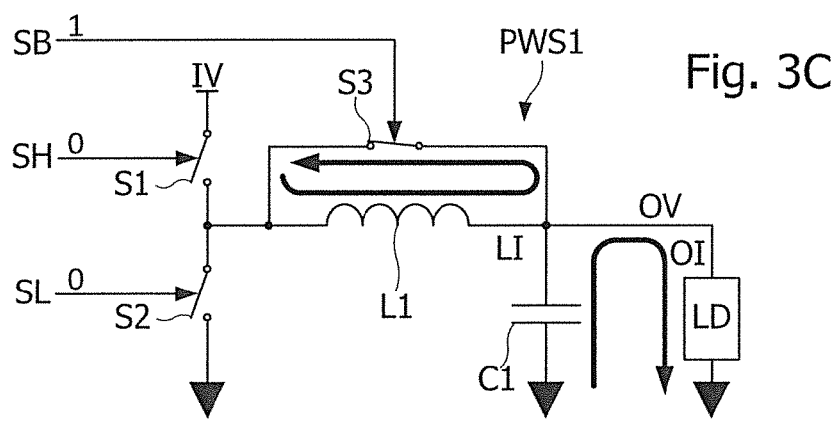

FIGS. 3A, 3B, 3C illustrate operation modes of the switched power stage PWS1. In the operation mode of FIG. 3A, switch S1 is turned on, whereas switches S2 and S3 are turned off. Therefore, in this mode a current flows from the voltage source supplying input voltage IV through inductor L1, to the ground through capacitor C1 which charges and through the load LD.

In the operation mode of FIG. 3B, switch S2 is turned on, whereas switches S1 and S3 are turned off. Therefore, in this mode a current flows from the ground through inductor L1, to the ground through capacitor C1 which discharges and through the load LD.

In the operation mode of FIG. 3C, switch S3 is turned on, whereas switches S1 and S2 are turned off Therefore, in this mode, current flows in the loop formed by inductor L1 and switch S3 in on-state and capacitor C1 discharges through the load LD. Thus in this operation mode load current is exclusively supplied by capacitor C1.

It should be noted that switch S2 may be omitted (inductor L1 never linked to ground). Such an embodiment is suitable in particular when the current OI to be supplied to the load LD is sufficiently low.

Figure 4A:
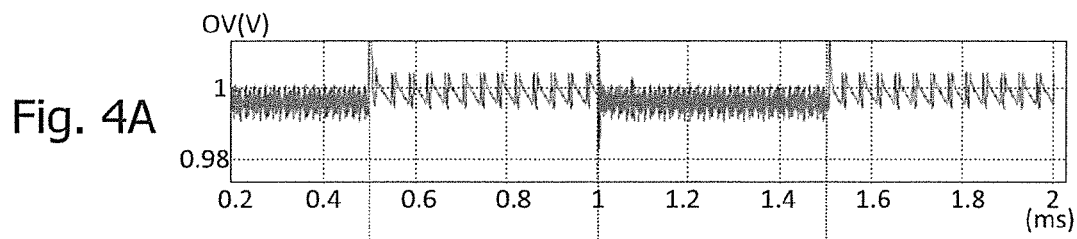
FIGS. 4A, 4B, 4C, 4D, 4E, 4F are timing chart of signals illustrating operation of the switched power stage.
Figure 4B:
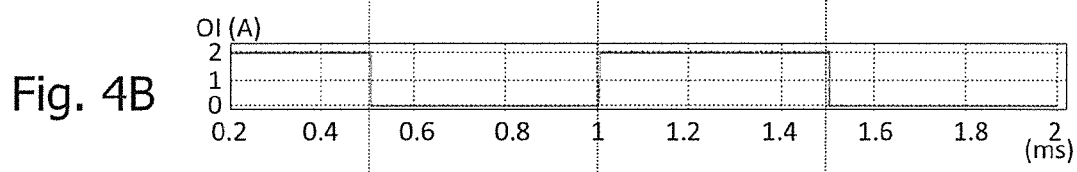
Figure 4C:
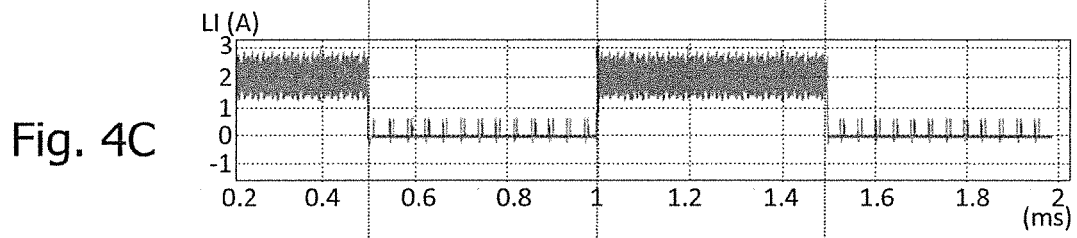

FIGS. 4A, 4B, 4C, 4D, 4E, 4F are timing chart of signals illustrating an operation of the switched power stage PWS1 used as a DC-DC converter, when the inductance of inductor L1 is set to 80 nH, the capacitance of capacitor C1 is set to 20 µF and the switching frequency is set to 10 MHz. FIG. 4A represents variations of output voltage OV. FIG. 4B represents variations of load current OI. FIG. 4C represents variations of inductor current LI. In FIG. 4B, load current OI remains substantially constant during periods of low and high current demand from the load LD. During periods of high load current demand, the load LD draws a current OI of about 2 A. During periods of low load current demand, the current drawn by the load LD is substantially null. The output voltage OV is regulated around 1 V so as to present ripples limited between 0.98 and 1.02 V (FIG. 4A). The inductor current LI varies between 0 A during the periods of low load current demand, and 2 A during periods of high load current demand. The ripples of inductor current LI have an amplitude lower than 1 A.

Figure 4D:
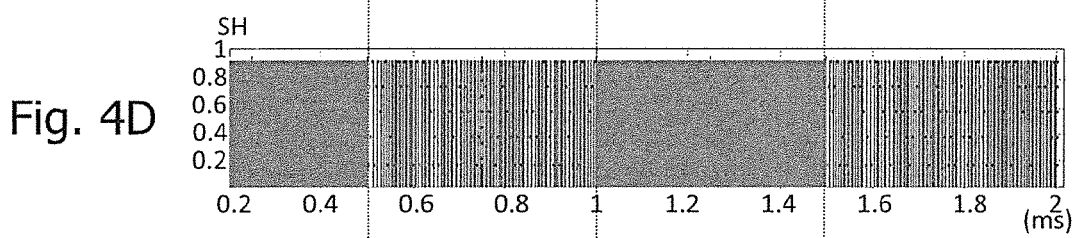
Figure 4E:
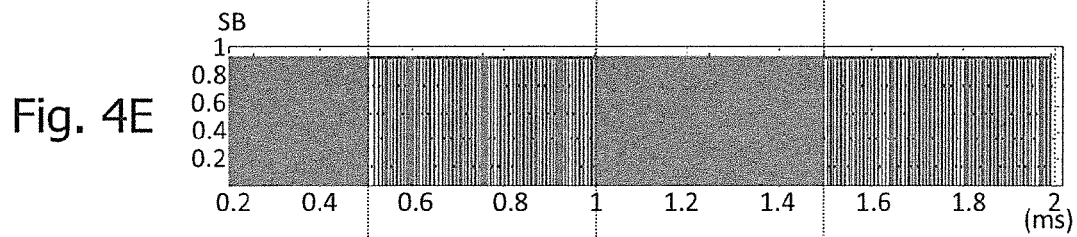
Figure 4F:
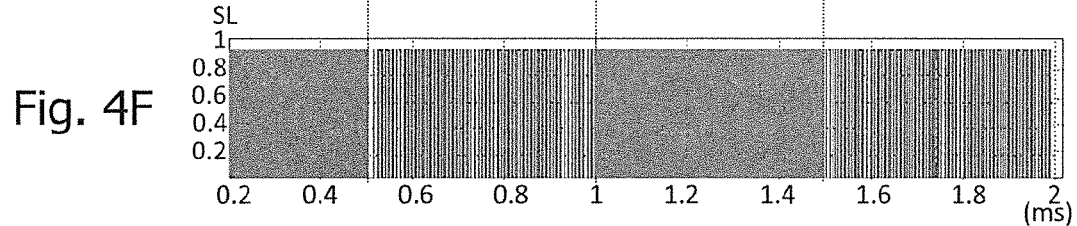

FIGS. 4C, 4D, 4E show variations of the control signals SH, SB and SL, respectively, in correspondence with FIGS. 4A, 4B, 4C. The control signals SH, SB, SL oscillate between 0 and 1 depending on values of output voltage OV and current OI.

FIGS. 4D, 4C, 4E show that the commutation frequencies of the control signals SH, SB, SL is higher during periods of high load current demand than during periods of low load current demand. It should be noted that the time scale used in FIGS. 4D, 4C, 4E is too small to show that when one of the signals SH, SB, SL is set to 1, the others of the signals SH, SB, SL are set to 0.

Figure 5:
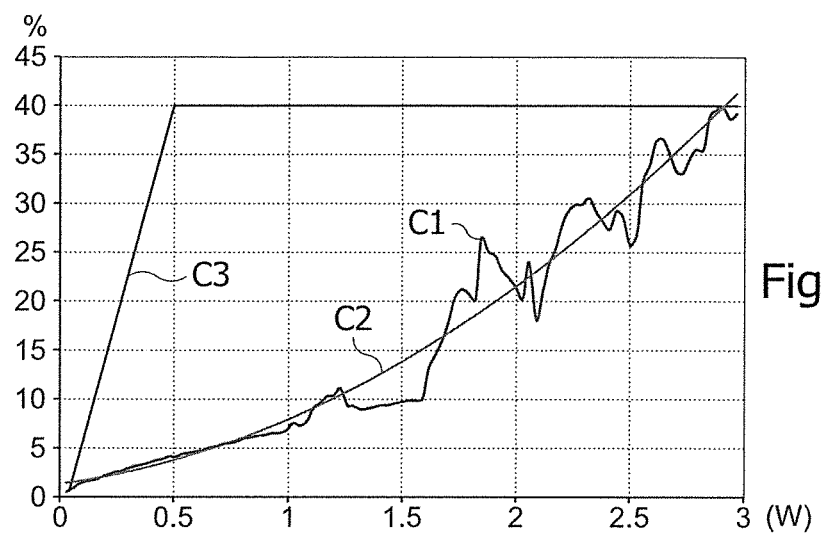
FIG. 5 shows curves of switching frequency variations of power stage switches as a function of supply power provided by the switched power stage.

FIG. 5 shows curves C1, C2 of variation of the commutation frequencies of the switching signals SH, SL as a function of supply power provided by the power stage PWS1. The frequencies are indicated in percentages of a maximum switching frequency. A typical maximum switching frequency may be equal to 10 MHz, but could be scaled up to much higher frequencies. FIG. 5 also shows a curve C3 of variation of the commutation frequencies of switches S1, S2 as a function of supply power provided by the power stage PWS of FIG. 1. Curve C1 corresponds to frequency measures whereas curve C2 corresponds to frequency average values. Curves C1, C2 show that the commutation frequency of signals SH, SL rises from 0 to approximately 40% when supply power rises from 0 to approximately 3 W. It should be noted that since the supply voltage OV is regulated and thus substantially constant, supply power is proportional with supply current intensity OI.

Figure 1:
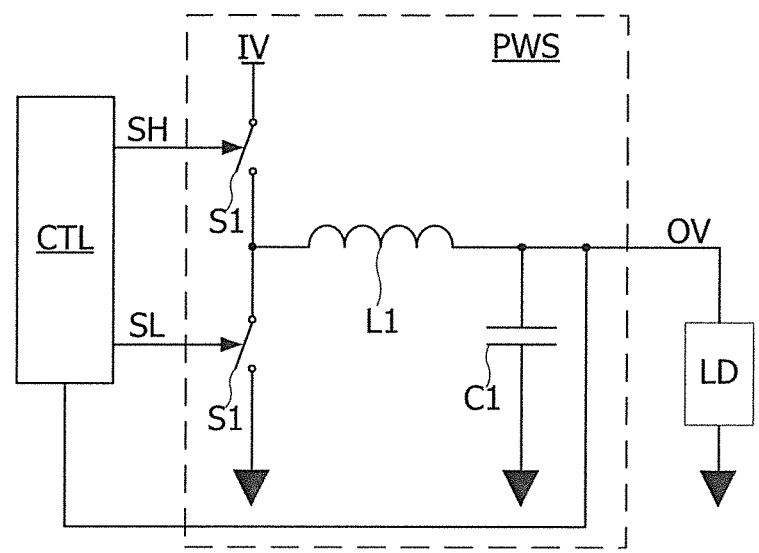
FIG. 1 previously described is a circuit diagram of a conventional switched power stage.

By contrast as shown by curve C3, switches S1, S2 of the power stage PWS of FIG. 1 must be controlled at a commutation frequency of about 40% as soon as the supply power requested by the load LD is greater than 0.5 W. It should be noted that switches S1, S2 generate energy losses which increase with their commutation frequency.

Figure 6A:
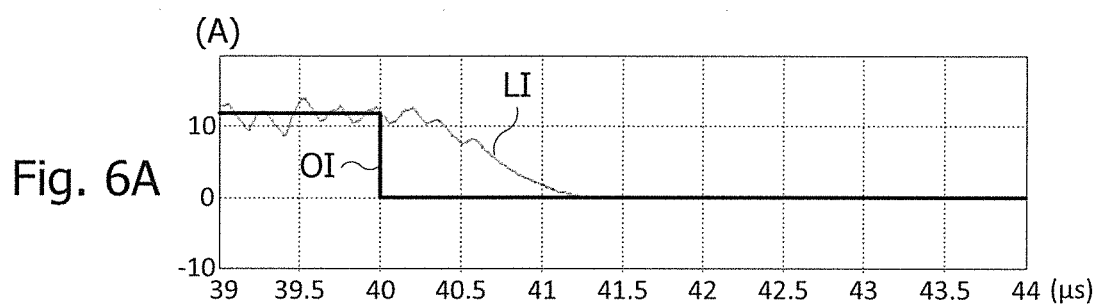
FIGS. 6A, 6B are timing chart of signals illustrating operation of the switched power stage used as a DC-DC converter.
Figure 6B:
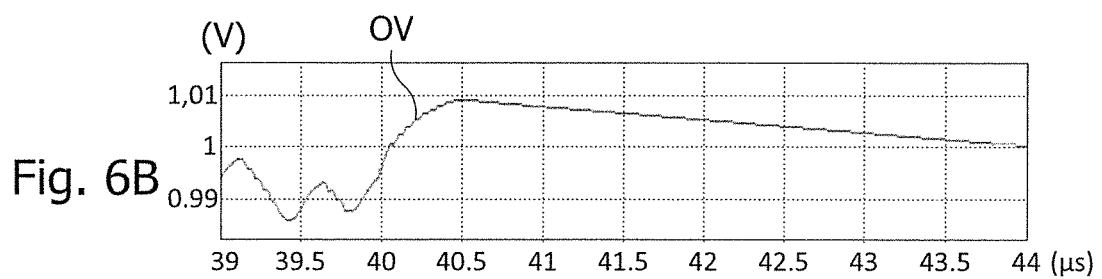

FIGS. 6A, 6B are timing chart of signals illustrating an operation of the switched power stage PWS1 used as a DC-DC converter, when the current drawn by the load LD drops. FIG. 6A shows intensity variations of output and inductor currents OI and LI. FIG. 6B shows corresponding variations of output voltage IV. In FIG. 6A, at time 40 µs the current OI drawn by the load LD drops almost instantaneously from about 12 A to less than 1 A. At this time, switches S2 and S3 are turned off and switch S3 is turned on. Current LI begins to drops at time 40.25 µs from about 12 A to reach 0 A at time 41 µs. From time 41.25 µs, current LI substantially remains zero. In FIG. 6B, output voltage OV has a regulated nominal value at 1 V with a tolerance margin lower than 2%, and reaches a maximum value of less than 1.01 V at time 40.5 µs. After this time, switch S3 is maintained in its on-state, and voltage OV slowly decreases, which corresponds to discharge of the capacitor C1 into the load LD. It should be noted that no voltage overshoot appears in the output voltage OV when the output current OI suddenly drops.

Figure 7A:
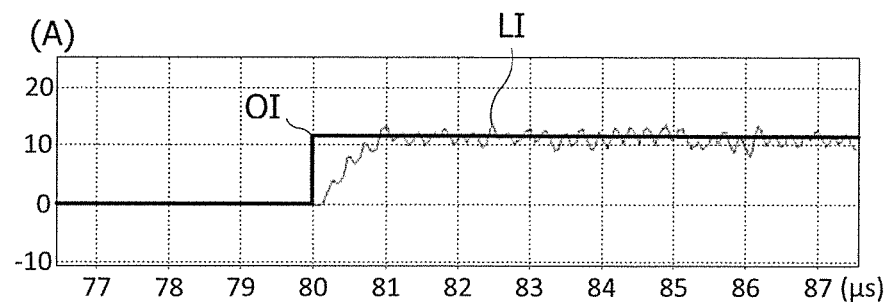
FIGS. 7A, 7B are timing chart of signals illustrating operation of the switched power stage used as a DC-DC converter.
Figure 7B:
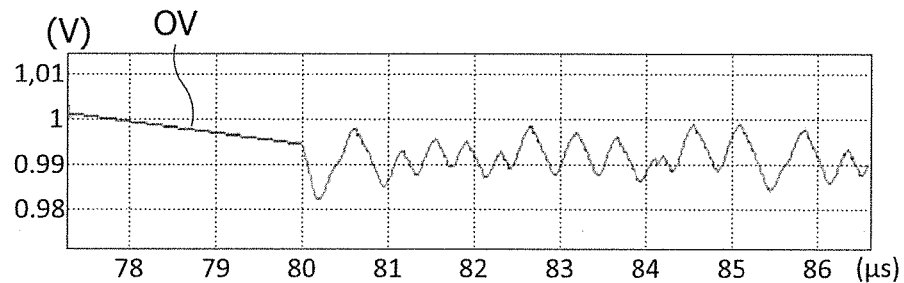

FIGS. 7A, 7B are timing chart of signals illustrating an operation of the switched power stage PWS1 used as a DC-DC converter, when the current drawn by the load LD jumps from 0 to about 12 A. FIG. 7A shows intensity variations of output and inductor currents OI and LI. FIG. 7B shows corresponding variations of output voltage IV. In FIG. 7A, at time 80 µs the current OI drawn by the load LD jumps almost instantaneously from about 0 A to around 12 A. Before this time, inductor current LI is substantially zero and switches S2 and S3 are off whereas switch S3 is on. At time 80 μs, switch S3 is turned off and switch S1 is turned on. Then current LI begins to rise from zero to reach 10 to 14 A at time 81 μs. From this time, output voltage OV is regulated by successively turning on and off the switches S1, S2, S3.

In FIG. 7B, output voltage OV has a regulated nominal value of 1 V with a tolerance margin lower than 2%. Before time 80 μs, output voltage OV slowly decreases down to 0.995 V, corresponding to discharge of capacitor C1 (switch S3 closed). After time 80 μs, output voltage OV ripples between 0.985 and 1 V corresponding to a regulation phase during which switches S1, S2, S3 are successively turned on and off, only one switch being closed at each time.

FIGS. 6A, 6B, 7A, 7B show that the power stage PWS1 offers a fast response to load current transients, by preventing the output voltage OV from varying more than 2%, and voltage overshoots.

Figure 8:
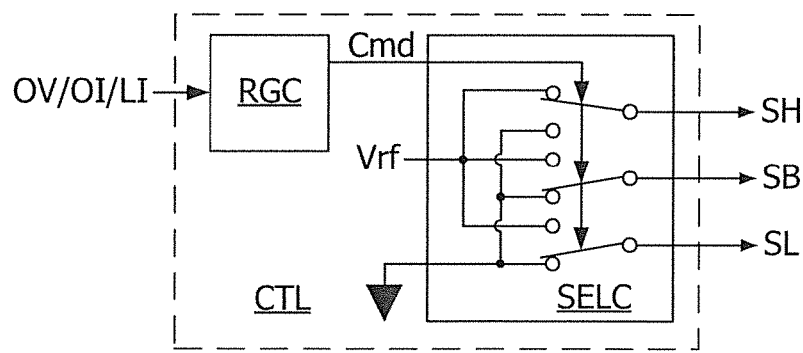
FIG. 8 is a circuit diagram of a control circuit of the switched power stage, according to an embodiment.

FIG. 8 is a circuit diagram of the control circuit CTL, according to an embodiment. In the embodiment of FIG. 8, the circuit CTL comprises a regulation circuit RGC and a selector SELC. The regulation circuit RGC is configured to generate a command signal Cmd as a function of intensity measures of currents LI and OI, and/or as a function of voltage measures of output voltage VI. The selector SELC receives a reference voltage Vrf and has three states H, B, L, one of which being selected as a function of the command signal Cmd. In state H, the control signal SH is set to the reference voltage Vrf. In state B, the control signal SB is set to the reference voltage Vrf. In state L, the control signal SL is set to the reference voltage Vrf.

Figures 9A, 9B, 9C:
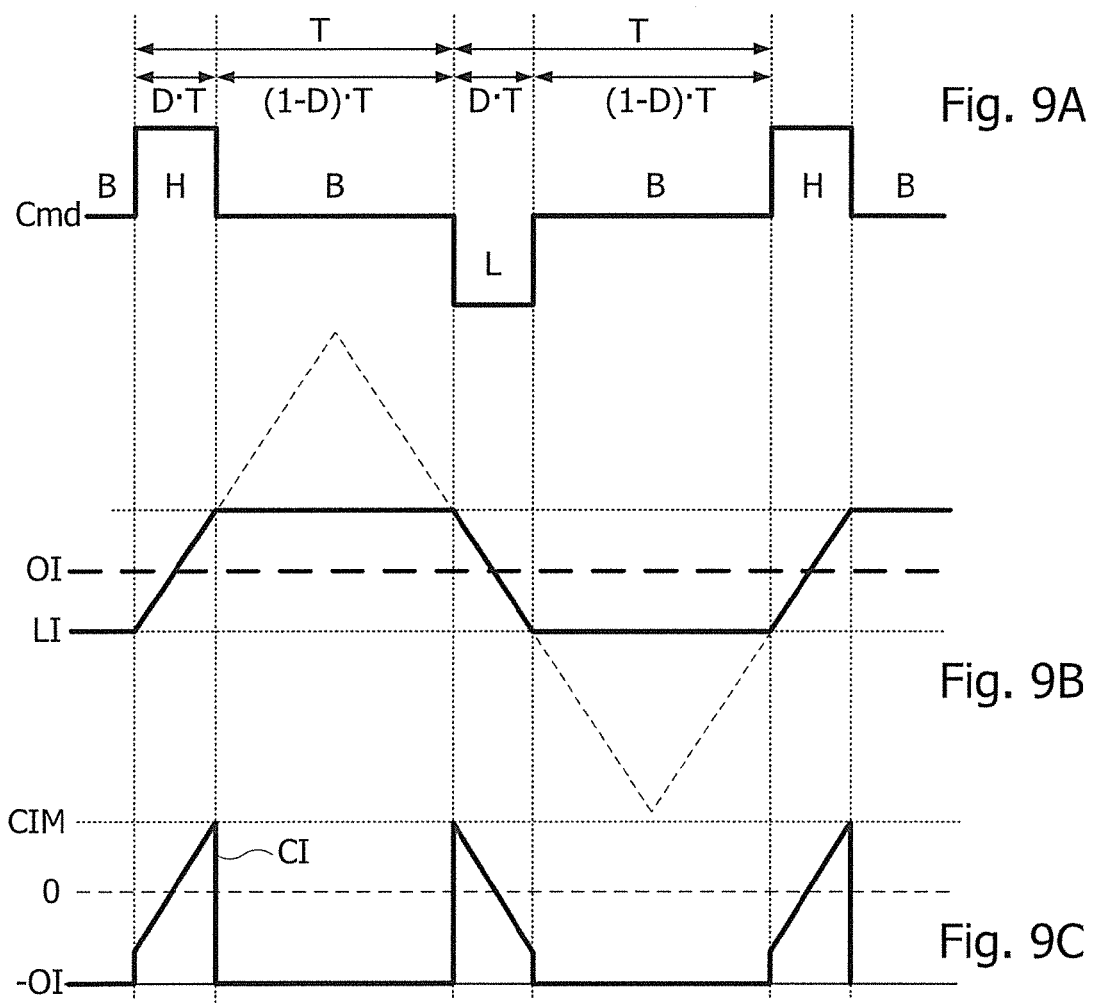
FIGS. 9A, 9B, 9C are timing chart of signals illustrating operation of the switched power stage.

FIGS. 9A, 9B, 9C are timing charts of signals illustrating an operation of the switched power stage PWS1. These charts have been established considering that switch S3 has a null resistance value when it is on. FIG. 9A shows variations of the command signal Cmd. In the example of FIG. 9A, the command signal Cmd is periodic with a period 2T. In a first half period T, the signal Cmd is first set to state H during D·T (D being a real number comprised between 0 excluded, and 1), and then set to state B during (1−D)·T. In a second half period T, the signal Cmd is set to state L during D·T, and then set to state B during (1−D)·T.

FIG. 9B shows corresponding variations of current LI and load current OI. In the example of FIG. 9B, load current OI remains constant. When command signal Cmd is set to state H, inductor current LI rises with a substantially constant slope. When command signal Cmd is set to state L, inductor current LI falls with a substantially constant slope, substantially opposite to the slope when the command signal is set to state H. When command signal Cmd is set to state B, current LI remains constant.

FIG. 9C shows corresponding variations of a current CI in capacitor C1. When command signal Cmd is set to state B, capacitor current CI remains constant at a value −OI substantially opposite to the intensity of load current OI. When command signal Cmd is set to state H, current CI first rises from the value −OI with a substantially vertical slope, and then up to a positive maximum value CIM with a lower substantially constant slope. When command signal Cmd returns to state B, current CI drops to value −OI with a substantially vertical slope. When command signal Cmd is set to state L, current CI rises from the value −OI (opposite value of OI) with a substantially vertical slope up to the previous maximum value CIM reached when command signal was set to state H (corresponding to the previous charge of capacitor C1), and then falls with a substantially constant slope, substantially opposite to the slope when the command signal Cmd was set to state H (corresponding to a minimum charge value of capacitor C1). When command signal Cmd returns to state B, current C1 drops to value −OI with a substantially vertical slope.

FIGS. 10A, 10B, 10C are timing chart of signals illustrating an operation of the switched power stage PWS1. These charts have been established considering that the switch S3 forms a non-zero resistance when it is on. FIG. 10A which is identical to FIG. 9A, shows variations of command signal Cmd. FIG. 10B shows corresponding variations of current LI and load current OI. In the example of FIG. 10B, load current OI remains constant. When command signal Cmd is set to state H, inductor current LI rises with a substantially constant slope. When command signal Cmd is set to state L, inductor current LI falls. When command signal Cmd is set to state B, current LI falls with a slope which is lower than the slope when command signal Cmd is set to state L. FIG. 10C shows corresponding variations of the current CI in capacitor C1. FIG. 10C is substantially the same as FIG. 9C.

With the control mode of FIGS. 9A, 10A, the transfer function of the switched power stage PWS1 may be modeled as follows:

$$\frac{Ov}{Iv(z)} = \frac{1}{\left(1 + \frac{L}{D \cdot T \cdot R} + \frac{L \cdot c}{(D \cdot T)^2}\right) - \left(\frac{L}{D \cdot T \cdot R} + 2\frac{L \cdot c}{(D \cdot T)^2}\right)z^{-1} + \frac{L \cdot c}{(D \cdot T)^2}z^{-2}} \quad (1)$$

where L and R are the inductance and resistance value of inductor L1, C is the capacitance of capacitor C1, and D and T are as defined in FIG. 9A, 10A.

Next, it is assumed that L'=L/D and C'=C/D, D ranging from zero excluded, to 1. The transfer function (1) becomes as follows:

$$\frac{Ov}{Iv(z)} = \frac{1}{\left(1 + \frac{L'}{T \cdot R} + \frac{L' \cdot C'}{T^2}\right) - \left(\frac{L'}{T \cdot R} + 2\frac{L' \cdot C'}{T^2}\right)z^{-1} + \frac{L' \cdot C'}{T^2}z^{-2}} \quad (2)$$

As the power stage PWS1 operates at frequencies ranging from 3 to 12 MHz, z−1 can be approximated by 1−s·T. The transfer function (2) becomes:

$$\frac{Ov}{Iv(z)} = \frac{1}{1 + \frac{L'}{R}S + L' \cdot C' \cdot S^2} \quad (3)$$

The transfer function (3) corresponds to the one of circuit of FIG. 1, i.e., without switch s3 where L' and C' are the inductance and capacitance of inductor L1 and capacitor C1 of this circuit. Therefore, adding the switch s3 with the control sequence of FIG. 9A may be considered equivalent to use an inductor and a capacitor in the circuit of FIG. 1 having inductance and capacitance values multiplied by the factor 1/D, D ranging from 0 excluded, to 1. Thus it can be considered that the inductance and capacitance of inductor L1 and capacitor C1 are magnified.

FIG. 11 is a flow chart of an example of process executed by the control circuit CTL to control switches S1, S2, S3, according to an embodiment in which the DC-DC converter operates as a voltage regulator. This process comprises steps S1 to S8. At step S1, the control circuit CTL compares the output voltage OV to a reference voltage Vrf. If output voltage
OV is equal to reference voltage Vrf, while considering a tolerance margin of ΔV, step S2 is executed, otherwise step S3 is executed. At step S2, signal SB is set to 1 to turn on switch S3. In other words, switch S3 is closed thereby feeding the load LD by capacitor C1, when the output voltage OV has the required value, i.e., reference voltage Vrf. The voltage tolerance margin ΔV may be set to a value between 1 and 5%.

At step S3, current intensity LI in inductor L1 is compared with the output current intensity OI. If inductor current intensity LI is lower than output current intensity OI reduced by a current tolerance margin ΔI, step S4 is executed otherwise step S5 is executed. At step S4, signal SH is set to 1 to turn on switch S1. At step S5, if inductor current intensity LI is greater than output current intensity OI increased by the current tolerance margin ΔI, step S6 is executed otherwise step S7 is executed. In other words, switch S1 is closed to feed load LD by the voltage source IV when the current drawn by the load LD is greater than the current LI in inductor L1 (output voltage OV too low), and switch S2 is closed to discharge capacitor C1 to ground when the current drawn by the load LD is lower than the current LI in inductor L1 (output voltage OV too high). The current tolerance margin ΔI may be set to a value between 1 and 5%.

At step S7, if inductor current intensity LI is negative, step S8 is executed, otherwise step S1 is executed again at a next clock cycle. At step S8, signal SB is set to 1 to turn on switch S3, which discharges inductor L1. At steps S2, S4, S6 and S8, before turning on a switch, the other switches are turned off. After steps S2, S4, S6 and S8, step S1 is executed again at a next clock cycle. Thus, each of switches S1, S2, S3 may remain in closed state during one or more successive clock cycles. Each of steps S2, S4, S6 and S8 may also consist in setting command signal Cmd of FIG. 8 to one of the states H (step S4), B (steps S2, S8) or L (step S6).

Of course, other processes may be defined to control switches S1, S2, S3, depending on a regulation type to be applied to the output voltage OV and/or current OI, or more generally depending on the function to be performed by the power stage. According to another example, step S4 could be executed when output voltage OV is lower than reference voltage Vrf reduced by the voltage tolerance margin ΔV, and step S6 could be executed when output voltage OV is greater than reference voltage Vrf increased by the voltage tolerance margin ΔV. More generally, switch S3 may be turned on each time load LD does not need more current or when capacitor C1 is sufficiently charged to supply the current requested by load LD without generating a significant voltage drop in output voltage OV.

Switches S1, S2, S3 may also be controlled at a constant frequency and a variable duty cycle, by a command signal having the form of a modulated signal provided by a signal modulation such as PWM (Pulse Width Modulation). Switches S1, S2, S3 may also be controlled at a variable frequency by a control signal provided by signal modulations such as PFM (Pulse Frequency Modulation), PDM (Pulse Density Modulation) or DPWM (Digital PWM).

FIGS. 12A, 12B, 12C, 12D show examples of timing chart of signals illustrating examples of the three-state command signal Cmd. In FIG. 12A, the signal Cmd is generated according to a PWM scheme. The period between two successive rising edges to the H-state is constant whereas the lengths of periods where signal Cmd remains in H- B- and L-state vary. In the example of FIG. 12A, signal Cmd stays at state H during a clock period, then stays at state B during two clock periods, then stays at state L during three clock periods and return to state B and stays in this state during two clock periods. It should be noted that the periods during which signal Cmd stays in a same state H, B, L do no necessary last an integer number of clock periods.

In FIGS. 12B, 12C, 12D, signal Cmd is controlled according to a PFM or PDM scheme. In the example of FIG. 12B, control signal Cmd changes of state at each clock period. In the example of FIG. 12C, control signal Cmd may stay in a same state H, B, L during several successive clock periods. In the example of FIG. 12D, control signal Cmd does not stay in states H and L more than one clock period but may stay in state B several successive clock periods. In the examples of FIGS. 12A, 12B, 12C, 12D, there is no direct transition between states H and L. However, such transitions may be possible in some applications both from H to L and L to H, provided that a dead time is allowed for preventing switches S1 and S2 from being on at the same time.

FIG. 13 is a circuit diagram of a DC-DC converter according to another embodiment. The circuit of FIG. 13 differs from the one of FIG. 2 in that switch S2 is replaced by a diode D1, for example of Shotky's type. With such a diode, the diode D1 is blocked in states of FIGS. 3A and 3B. The state of FIG. 3C (diode D1 conducting) automatically arises when the voltage at the junction node between diode D1, switches S1 and S3 and inductor L1 becomes lower than the ground voltage. Of course, diode D1 may be mounted in parallel with switch S2. In this way, if switch S2 is realized by a transistor, it can be of reduced size with respect to a transistor without a diode mounted in parallel.

Figure 14:
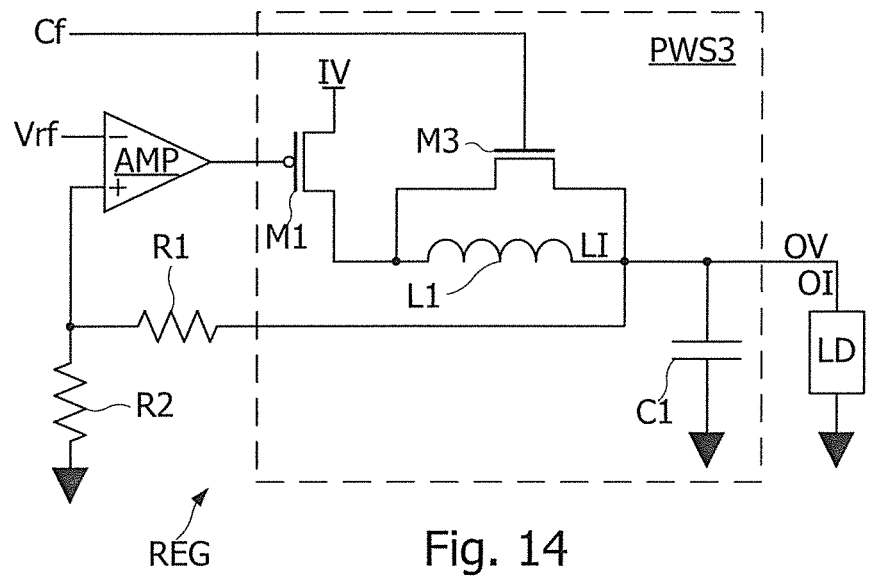
FIG. 14 is a circuit diagram of a Low Drop Out regulator according to an embodiment.

FIG. 14 is a circuit diagram of a Low Drop Out regulator REG according to an embodiment. The regulator REG comprises a switched power stage PWS2 that differs from the power stage PWS1 in that switches S1 and S3 are replaced by MOSFET transistors M1 and M3, and switch S2 is removed. Transistor M1 may be a p-channel transistor, and transistor M3 may be an n-channel transistor. The gate of transistor M3 is controlled by a configuration signal Cf. Current LI from transistor M1 may be measured by a resistive voltage divider comprising resistances R1 and R2 connected in series between the junction node connecting inductor L1 to capacitor C1, and ground. The junction node between the resistances R1, R2 and providing an inductor current measure, is connected to a negative input of a differential amplifier AMP. A reference voltage Vrf is provided to a positive input of the amplifier AMP. The output of the amplifier AMP is connected to the gate of transistor M1. When the configuration signal Cf turns on transistor M3, the regulator REG exactly operates as a classical LDO converter. When the configuration signal Cf turns off transistor M3, the regulator REG operates as the conventional power stage PWS of FIG. 1, without switch S2.

However switch S2 may be added to the circuit of FIG. 14 to link to ground the junction node connecting transistor M1 to inductor L1. The switch S2 may include a n-channel MOSFET transistor having a gate connected to the output of the amplifier AMP.

Figure 15:
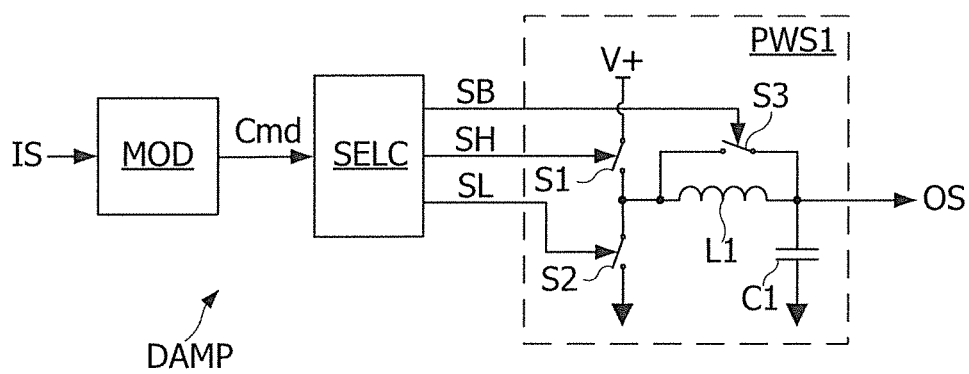
FIG. 15 is a circuit diagram of a class D power amplifier according to an embodiment.

FIG. 15 is a circuit diagram of a class D power amplifier according to an embodiment. The power amplifier DAMP comprises a modulator MOD, the selector circuit SELC of FIG. 8, and the power stage PWS1 with switches S1, S2, S3, inductor L1 and capacitor C1. The modulator MOD receives a signal IS to be amplified, and the junction node connecting inductor L1 to capacitor C1 provides an amplified signal OS. The modulator MOD which may be of the type sigma-delta, PWM, or PFM, provides to the selector SELC a three-state signal Cmd. Command signal Cmd may be in any of states H, B, L. Switch S1 is connected to a high voltage source V+ that may be a positive terminal of a battery, and switch S2 is connected to a low voltage source that may be at the ground voltage.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In particular, the present invention is not limited to a power stage with a single inductor. Thus inductor L1 may be formed by several inductors connected in series, and a switch may be connected in parallel to each inductor as switch S3. The switches connected in parallel with the inductors may be controlled separately to adjust the inductance of the power stage. Further each junction node between two inductors may be linked to ground by a capacitor.

Figure 16:
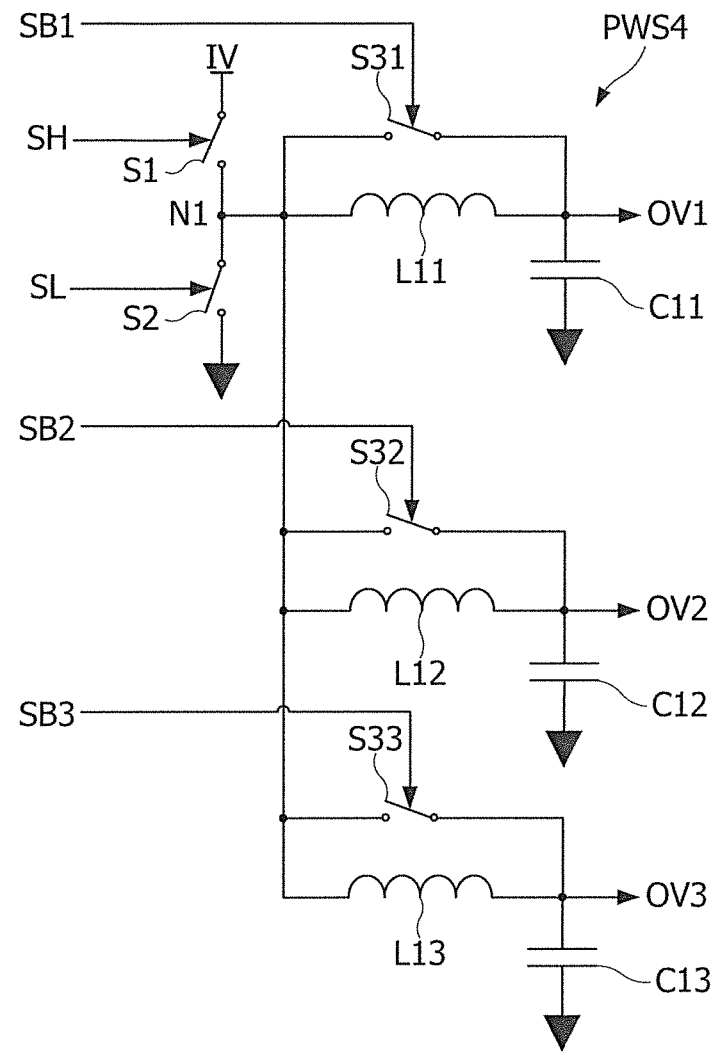
FIG. 16 is a circuit diagram of a power stage according to another embodiment.

In addition, as shown in FIG. 16, the power stage PWS4 may comprise several output stages for multiphase outputs, each output stage having an input N1 linked to the high voltage source IV by switch S1 and linked to ground by switch S2, and an output providing a respective supply voltage OV1, OV2, OV3. Each output stage comprises:

an inductor L11, L12, L13 having a first terminal connected to the input N1 of the output stage, and a second terminal connected to the output of the output stage, a capacitor C11, C12, C13 linking the second terminal of the inductor to ground, and a switch S31, S32, S33 connected between the first and second terminals of the inductor L11, L12, L13, and controlled by a respective and distinct signal SB1, SB2, SB3.

Figure 17:
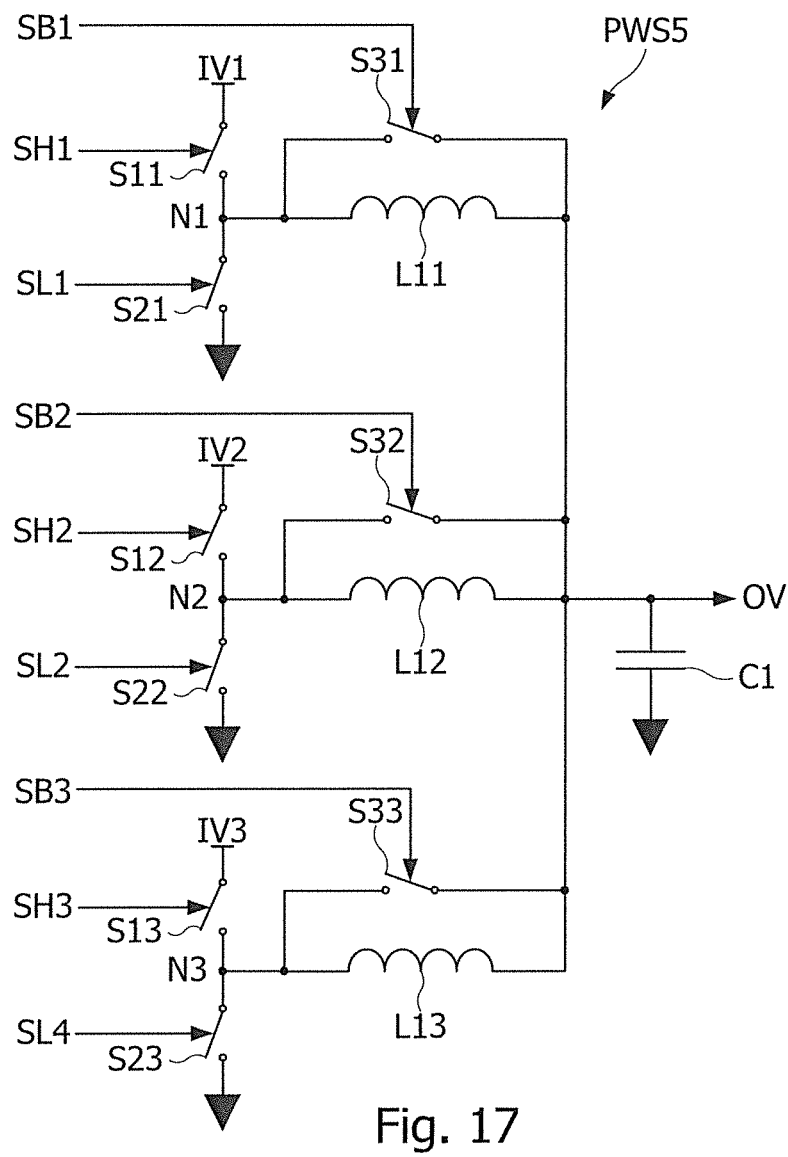
FIG. 17 is a circuit diagram of a power stage according to another embodiment.

As shown in FIG. 17, the power stage PWS5 may comprise several input stages for multiphase inputs and a single output stage comprising the capacitor C1 having a first terminal connected to ground and a second terminal providing the single supply voltage OV. Each input stage comprises:

a first switch S11, S12, S13 linking a respective high voltage source IV1, IV2, IV3 to a respective junction node N1, N2, N3, a second switch S21, S22, S23 linking the respective junction node N1, N2, N3 to ground, an inductor L11, L12, L13 having a first terminal connected to the respective junction node N1, N2, N3 and a second terminal connected to the second terminal of the capacitor, and a third switch S31, S32, S33 connecting the first and second terminals of the inductor L11, L12, L13.

Each of the switches S11, S12, S13, S21, S22, S23, S31, S32, S33 is controlled by a respective signal SH1, SL2, SH3, SL1, SL2, SL3, SB1, SB2, SB3.

Of course the power stages of FIGS. 16 and 17 may be combined with any of the circuits of FIGS. 13, 14, 15, i.e., any of the circuit of FIGS. 13, 14, 15 may form the input stages or the output stages of the circuits of FIGS. 16 and 17.

Further, the term "ground" in the foregoing more generally means a voltage or voltage source providing a voltage lower than the high voltage IV or V+. This low voltage may be positive, null or negative.

Although the invention has been discussed with respect to various embodiments, it should be recognized that the invention comprises the novel and non-obvious claims supported by this disclosure.

What is claimed is:

1. A switched power stage comprising:
an inductor having a first terminal linked to a high voltage source by a first switch;
a capacitor linking to a low voltage source a second terminal of the inductor, the second terminal of the inductor forming an output of the switched power stage;
a second switch linking the first terminal of the inductor to the low voltage source;
a third switch connected between the first and second terminals of the inductor; and
a controller configured to operate the first switch, second switch, and third switch so as to regulate the output of the power stage by closing the first switch, with the second switch and third switch open, for a first portion of a switching period, closing the third switch, with the first switch and the second switch open, for a second portion of the switching period following the first portion of the switching period, closing the second switch, with the first switch and third switch open, for a third portion of the switching period following the second portion of the switching period, and closing the third switch, with the first switch and the second switch open, for a fourth portion of the switching period following the third portion of the switching period.

2. The switched power stage of claim 1, wherein the first portion of the switching period and the third portion of the switching period are of the same duration.

3. The switched power stage of claim 1, wherein the second portion of the switching period and the fourth portion of the switching period are of the same duration.

4. The switched power stage of claim 1, wherein the first portion of the switching period and the third portion of the switching period are of the same duration and wherein the second portion of the switching period and the fourth portion of the switching period are of the same duration.

* * * * *